United States Patent [19]
Kozinski

[11] 3,834,451
[45] Sept. 10, 1974

[54] AIR CONDITIONING SYSTEM WITH MULTIPLE FUNCTION HEAT EXCHANGER

[75] Inventor: Richard C. Kozinski, Warren, Mich.
[73] Assignee: General Motors Corporation, Detroit, Mich.
[22] Filed: Apr. 13, 1973
[21] Appl. No.: 350,918

[52] U.S. Cl.................................. 165/23, 165/43
[51] Int. Cl............................................ B60h 3/00
[58] Field of Search...... 98/207 DL; 165/23, 42–44, 165/29, 30

[56] References Cited
UNITED STATES PATENTS
2,401,560  6/1946  Graham et al....................... 165/29
3,447,596  6/1969  Hughes.............................. 165/42

Primary Examiner—Charles Sukalo
Attorney, Agent, or Firm—K. H. MacLean, Jr.

[57] ABSTRACT

An automobile heating and air conditioning system including a thin-walled casing whose interior is divided by a horizontal wall member into an upper and a lower compartment. An evaporator is enclosed within the upper compartment and a combination condenser-engine coolant warmed heater is enclosed in the lower compartment. The lower compartment has one outlet to the passenger compartment of the automobile and another outlet to atmosphere. An air damper is pivotal between the two outlets to alternately block one or the other whenever the heating and air conditioning system is in a cooling or a heating mode of operation respectively. Air is passed through the evaporator and the condenser by blower means mounted on the divider wall. A recess in the divider wall beneath the evaporator collects water condensed on the evaporator and an opening through the wall member distributes the water onto the condenser to increase the effective cooling.

3 Claims, 3 Drawing Figures

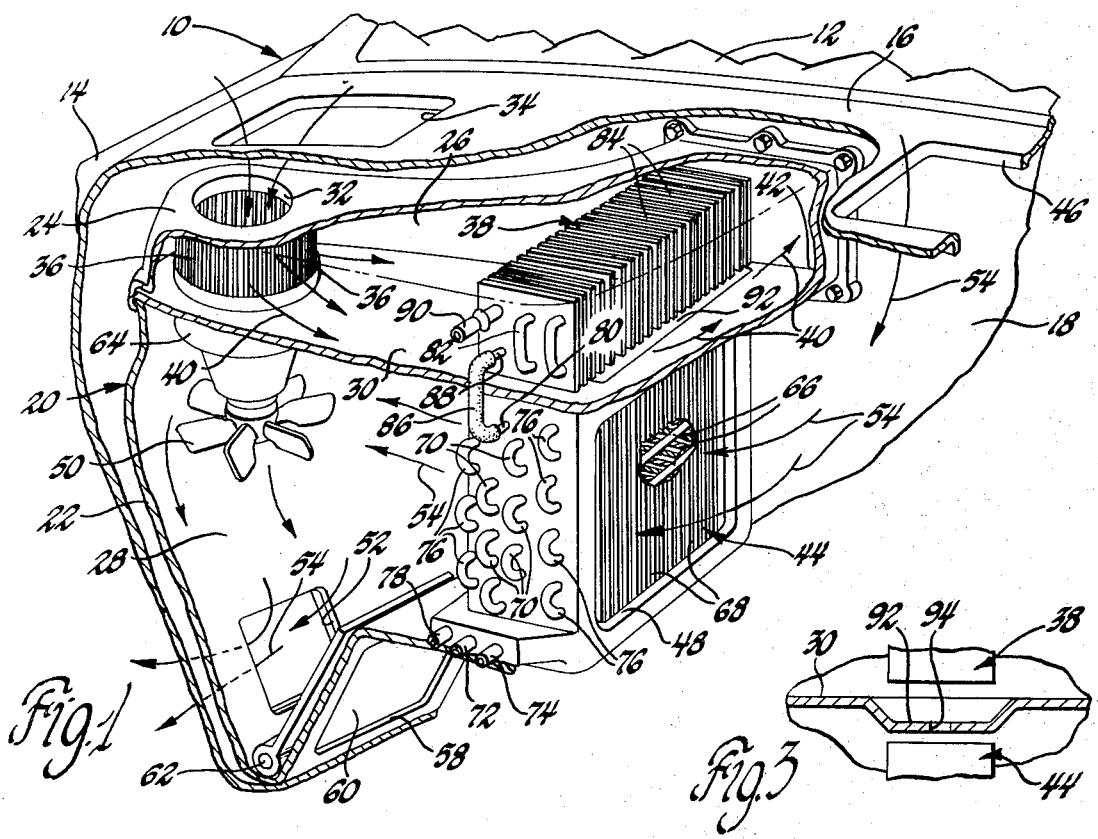
Fig.1
Fig.3
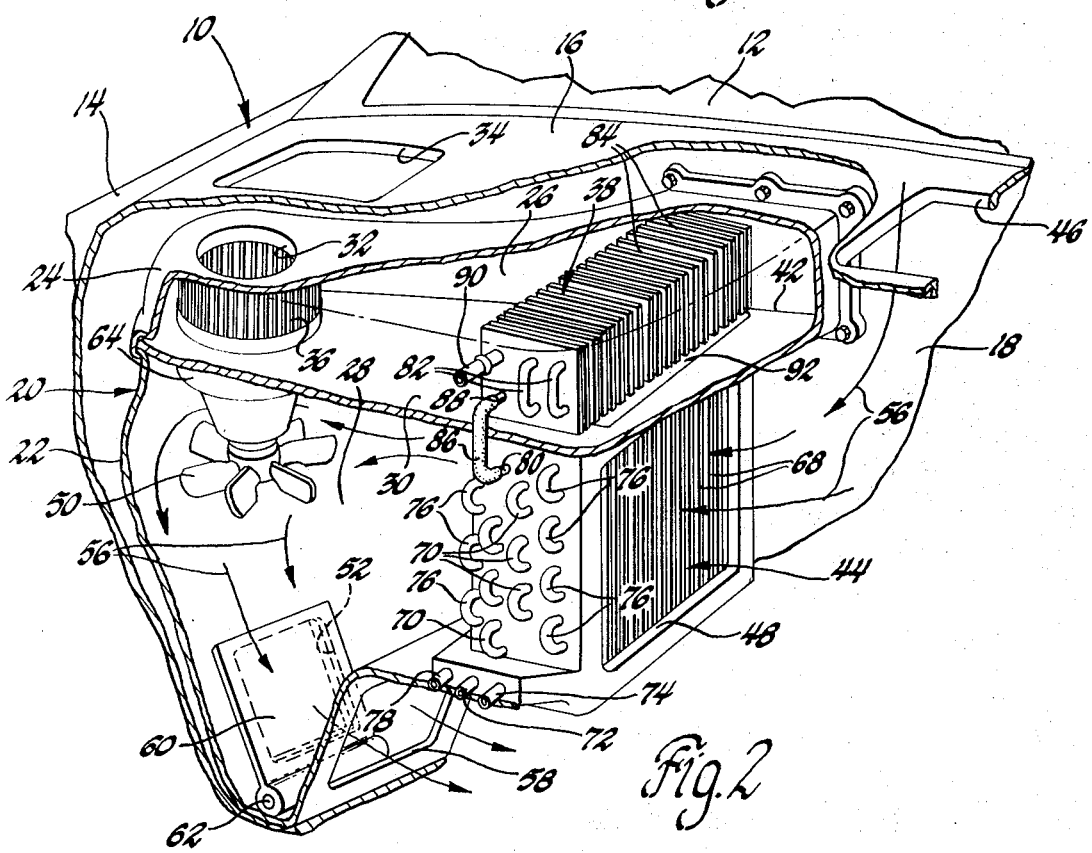
Fig.2

AIR CONDITIONING SYSTEM WITH MULTIPLE FUNCTION HEAT EXCHANGER

This invention relates to automobile air conditioning and heating systems.

The present invention provides a compact, efficient and versatile automobile heating and air conditioning system. In modern automobiles, the condenser is mounted in front of the automobile radiator and the evaporator is mounted near the automobile firewall. The present invention locates the evaporator and the condenser as well as a coolant warmed heated together near the automobile firewall. An advantage of locating the evaporator, condenser and heater together is a reduction in hose or conduit between the air conditioning components.

Another advantage of the present heating and air conditioning system is a space reduction in the engine compartment. The combination condenser and coolant warmed heater is a compact heat exchanger consisting of parallel tube passes through a common stack of finned members. The tube passes are interconnected to produce two distinct separate fluid passages through the finned surfaces. During a cooling mode of operation, the engine coolant passage is deactivated to prevent coolant circulation therethrough and refrigerant is passed through the condenser passage to cool refrigerant therein. During a heating mode of operation, the air conditioning system may be either deactivated or the heat given off by the condensing operation may be combined with the heat from the engine coolant portion to warm the passenger compartment.

In the present invention, the evaporator is located vertically above the combination condenser-coolant warmed heater in the casing and they are separated by a horizontal wall. A recess in the wall is utilized to collect water condensed by the cold evaporator. The collected water then passed through an opening in the wall and discharges onto the condenser. This materially increases the cooling capacity of the condenser.

The present heating and air conditioning system requires minimal auxiliary controls to produce regulated heating and cooling for the passenger compartment. When cooling is desired, the air conditioning system can be activated by known means such as energization of an electromagnetic clutch of the compressor. A fan draws air into the upper compartment of the casing and through the evaporator to an outlet to the passenger compartment. Simultaneously, air is drawn by another fan through the condenser which is located in the lower compartment. The air is exhausted to atmosphere through an outlet in the casing. When a heating mode of operation is desired, the air conditioning system may either be deactivated or continue to operate but in the latter case, the air flow through the evaporator is regulated by damper means. Warm engine coolant is passed through the combination condenser-heater to heat air which is then discharged through an outlet to the passenger compartment. A pivotal air damper is movable between cooling and heating positions to alternately block the passage of air from the lower compartment into the passenger compartment or to atmosphere. For additional heating, the air conditioning system may continue to operate and the heat from condensing refrigerant used to supplement the heat furnished by engine coolant.

Therefore, an object of the present invention is to provide a simple, compact and versatile automobile air conditioning and heating system including a casing which is divided into two compartments the first enclosing an evaporator and the second enclosing a condenser and engine warmed heater means located adjacent the engine firewall.

Another object of the present invention is to provide a compact air conditioning and heating system by utilizing a casing which is separated into one compartment enclosing an evaporator and another compartment enclosing a combination condenser-engine coolant warmed heater including two separate fluid passages through a common stack of finned surfaces.

A still further object of the present invention is to provide an efficient heating and air conditioning system including a casing which is internally divided by a substantially horizontal wall into an upper compartment housing an evaporator and a lower compartment housing a combination condenser and engine coolant warmed heater and having an opening beneath the evaporator to funnel condensate from the evaporator and discharge it onto the condenser for increased condenser efficiency.

Further objects and advantages of the present invention will be more readily apparent from the following detailed description, reference being had to the accompanying drawings in which a preferred embodiment of the invention is clearly shown.

IN THE DRAWINGS

FIG. 1 is a perspective view of the subject heating and air conditioning system while in a cooling mode of operation;

FIG. 2 is a perspective view similar to FIG. 1 of the heating and air conditioning system while in a heating mode of operation; and FIG. 3 is a fragmentary sectional view through the divider wall directly beneath the evaporator shown in FIGS. 1 and 2.

In the drawings, a portion of an automobile 10 is illustrated with part of the windshield 12 visible as well as part of the right front fender 14 and part of the hood 16. The firewall 18 supports a thin walled casing or housing 20 which includes a lower portion 22 and an upper portion 24. The casing 20 defines an interior space which is separated into an upper compartment 26 and a lower compartment 28 by a substantially horizontal wall 30. An inlet 32 to upper compartment 26 in casing 20 is adapted to emit air drawn through an opening 34 in the hood. A blower or fan 36 directs the air through an evaporator 38 as indicated by arrows 40 which enters the passenger compartment through opening 42. The arrows 40 illustrate the path of air during a cooling mode of operation.

The lower portion 22 of the casing 20 encloses a compartment 28 in which a combination refrigerant condenser and engine coolant warmed heater 44 is mounted. Air is drawn by a fan 50 through an opening 46 in hood 16 and the opening 48. The air then passes through the combination condenser-heater into lower compartment 28 before discharge through an opening 52 to atmosphere when in a cooling mode of operation as in FIG. 1. The arrows 54 in FIG. 1 trace the flow of air through the lower compartment 28 during a cooling mode.

When the heating and air conditioning system is in a heating mode of operation, as in FIG. 2, air flows through openings 46 and 48 as indicated by arrows 56. The air then passes through the combination condenser-heater into compartment 28 from which it is discharged through an outlet or opening 58 into the passenger compartment of the automobile. An air damper 60 which is pivotal about axis 62 is located between the openings 52, 58 and is pivoted between the cooling position shown in FIG. 1 and the heating position shown in FIG. 2. In the cooling position, the damper 60 blocks opening or outlet 58 and in the heating mode of operation, the damper 60 blocks the outlet 52 to atmosphere.

The provision of dividing wall 30 between the upper and lower compartments 26 and 28 of casing 20 permits a single motor 64 to power both the fan 36 and fan 50.

The combination condenser-engine coolant warmed heater 44 may be of the fin and tube type including adjacent parallel tube passes 66 through a plurality of common finned surfaces 68. The finned surfaces extend in a plane substantially normal to the axial direction of the tube passes 66 for air passage therebetween.

U-shaped end portions 70 interconnect the ends of a number of the tube passes to form a continuous fluid passage through the finned surfaces 68 extending from a coolant inlet 72 to a coolant outlet 74. The engine coolant is conveyed by a hose (not shown) to the inlet 72 and through passes 66 and U-shaped end portions 70 to the coolant outlet 74 to warm the finned surfaces and air passing through the combination condenser-heater. The remaining tube passes are interconnected by U-shaped tube portions 76 to form a refrigerant passage through the finned surfaces 68 which extend from a refrigerant inlet 78 to an outlet 80. The inlet 78 is adapted to be connected to the outlet of the compressor by a hose (not shown).

Supported in the upper compartment 26 is a tube and fin type evaporator having parallel tube passes similar to passes 66 in the condenser-heater. U-shaped end portions 82 interconnect tube passes to form a continuous passage through the stack of parallel finned surfaces 84. A short length, small diameter capillary or orifice tube expander 86 may be used to interconnect the outlet 80 of the condenser 44 with an inlet 88 of the evaporator 38. An outlet 90 of the evaporator is adapted to be connected to an inlet of a refrigerant compressor (not shown). Alternately, another type of commonly used expansion valves may be substituted for expander 86.

As shown in FIG. 3, the divider wall has a trough or recess 92 formed directly beneath the evaporator 38 and above condenser 44. The recess collects water which condenses on the cool evaporator. An elongated opening 94 in the bottom of recess 92 discharges water collected in recess 92 onto condenser 44 which supplements the cooling by air passing therethrough.

While the embodiment described above and shown in the accompanying drawings is a preferred embodiment, other embodiments might be adapted.

What is claimed is as follows:

1. An automobile heating and air conditioning system comprising: a thin walled casing defining an interior adapted to conduct both heated and cooled air into the passenger compartment; wall means dividing the interior of said casing into an upper compartment and a lower compartment; an evaporator in said upper compartment for cooling air passing therethrough when the evaporator is activated for cooling during an air conditioning mode of operation; a condenser in said lower compartment for warming air passing therethrough and located below said evaporator; air inlet means in said casing for permitting a flow of air into said upper and lower compartments; outlet means in said casing for discharging air from said upper and lower compartments into said passenger compartment; an opening through said casing communicating said lower compartment with atmosphere for discharging heated air other than through said outlet means into said passenger compartment; air damper means for blocking said opening to atmosphere to direct heated air into said passenger compartment when the system is in a heating mode of operation and for blocking said outlet means to said passenger compartment to direct heated air to atmosphere when the system is in a cooling mode of operation; air blower means for forcing air through said upper and lower compartments and said evaporator and condenser; an opening through said wall means between said upper and lower compartments located adjacent said evaporator for discharging water which has been condensed by said evaporator onto said condenser to increase its cooling capacity.

2. An automobile heating and air conditioning system comprising: a thin walled casing defining an interior adapted to conduct both heated and cooled air into the automobile passenger compartment; wall means dividing the interior of said casing into an upper compartment and a lower compartment; an evaporator in said upper compartment for cooling air passing therethrough when the evaporator is activated for cooling during an air conditioning mode of operation; a condenser in said lower compartment for warming air passing therethrough and located directly below said evaporator; air inlet means in said casing for permitting a flow of air into said upper and lower compartments; outlet means in said casing for discharging air from said upper and lower compartments into said passenger compartment; an opening through said casing communicating said lower compartment with atmosphere to discharge heated air other than through said outlet means into said passenger compartment; an air damper movable between a heating operative position blocking said opening to atmosphere and a cooling operative position blocking said outlet means to said passenger compartment for alternately directing heated air into said passenger compartment and to atmosphere; air blower means for forcing air through said evaporator and condenser; a recess formed in said divider wall means beneath said evaporator for collecting condensate; an opening in said recess and through said wall means for discharging the water collected by said recess onto said condenser.

3. An automobile heating and air conditioning system comprising: a thin walled casing defining an interior adapted to conduct both heated and cooled air into the automobile passenger compartment; wall means dividing the interior of said casing into an upper compartment and a lower compartment; an evaporator in said upper compartment for cooling air passing therethrough when the evaporator is activated for cooling during an air conditioning mode of operation; a combination condenser and engine coolant warmed heater in said lower compartment for warming air passing therethrough; air inlet means in said casing for permitting a flow of air into said upper and lower compartments; outlet means in said casing for discharging air from said upper and lower compartments into the automobile passenger compartment; an opening through said casing communicating said lower compartment with atmosphere to discharge heated air other than through said outlet means into said passenger compartment; air damper means for blocking said opening to atmosphere when the system is in a heating operative mode and alternately for blocking said outlet means to said passenger compartment when the system is in a cooling mode of operation; air blower means for forcing air through said upper and lower compartments and said evaporator and condenser; said combined condenser and coolant warmed heater including adjacent passes of tubes for conveying refrigerant and engine coolant which extend through a plurality of parallel finned surfaces whereby a portion of the tube passes are fluidly interconnected between an engine coolant inlet and an engine coolant outlet and the remaining tube passes are interconnected together between a refrigerant inlet and a refrigerant outlet; passage means connected at one end to said refrigerant outlet of said combination condenser and coolant warmed heater and connected at the the other end to an inlet of said evaporator for conveying refrigerant between said condenser and said evaporator.

* * * * *